Patented Oct. 17, 1922.

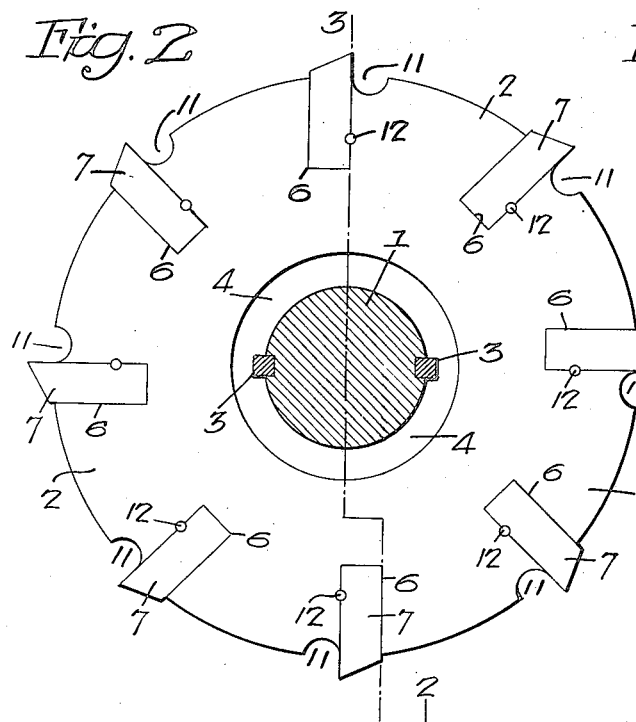
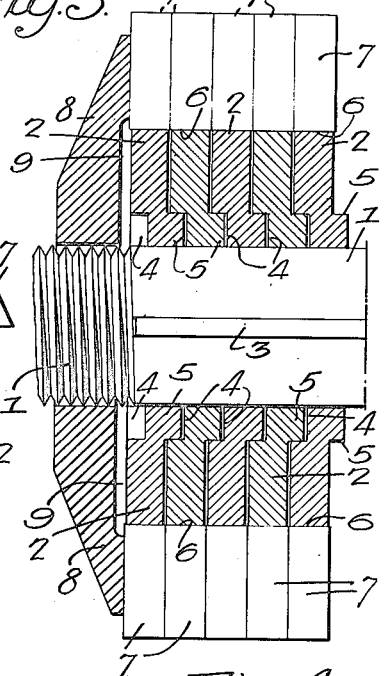
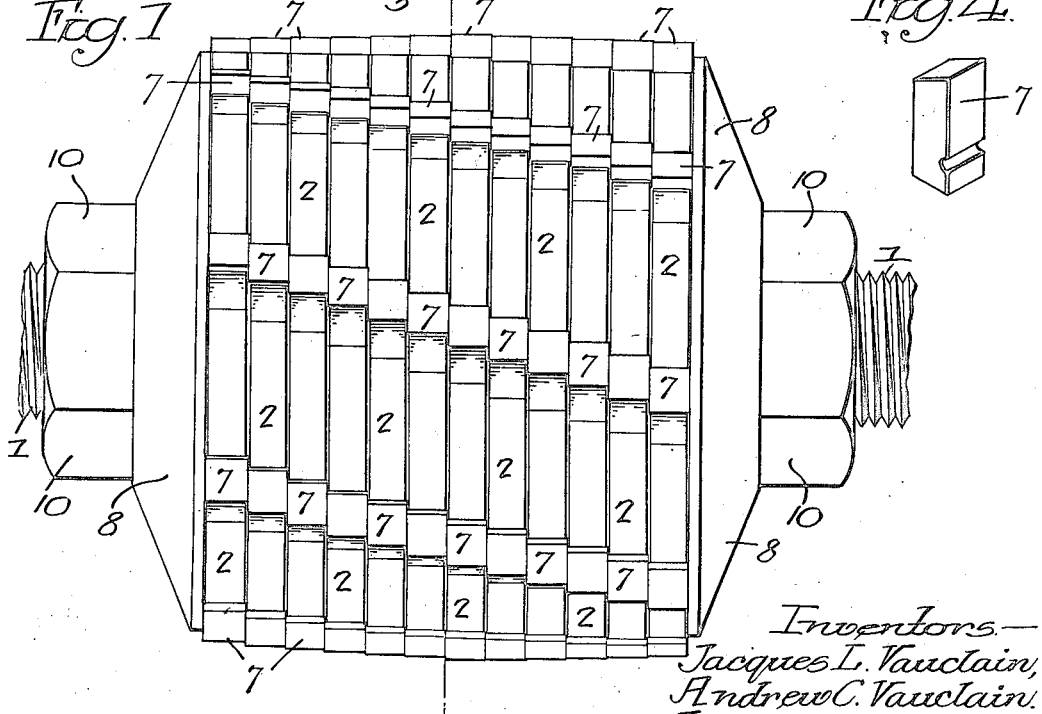

1,432,580

UNITED STATES PATENT OFFICE.

JACQUES L. VAUCLAIN, OF HAVERFORD, AND ANDREW C. VAUCLAIN, OF PHILADELPHIA, PENNSYLVANIA.

MILLING CUTTER.

Application filed March 5, 1921. Serial No. 449,740.

*To all whom it may concern:*

Be it known that we, JACQUES L. VAUCLAIN and ANDREW C. VAUCLAIN, citizens of the United States, residing in Haverford, Pennsylvania, and Philadelphia, Pennsylvania, respectively, have invented certain Improvements in Milling Cutters, of which the following is a specification.

One object of our invention is to make a milling cutter so that it can be increased or diminished in length.

A further object of the invention is to make the cutter of a series of body sections in which the teeth are located and to provide means for clamping the teeth independently of the body sections.

The invention also relates to certain details, which will be fully described hereinafter.

In the accompanying drawings:

Fig. 1 is a side view of our improved milling cutter;

Fig. 2 is a sectional view on the line 2—2, Fig. 1;

Fig. 3 is a sectional view on the line 3—3, Fig. 2; and

Fig. 4 is a detached perspective view of one of the cutters.

Referring to the drawings, 1 is a mandrel. 2 are a series of body sections, which are mounted on the mandrel and secured thereto by means of keys 3. These body sections are recessed on one side, as at 4, to receive projections 5, on an adjoining body section so that, when the body sections are assembled, they are interlocked, as shown in Fig. 3. Each body section has a series of radial recesses 6 in which are located teeth 7 of the type shown in Fig. 4. The teeth 7 are slightly wider than the body sections 2, so that when the sections are assembled side by side the teeth of one body section will be in contact with those of an adjoining section. At each side of the cutter are disks, or washers, 8, which are mounted on the mandrel 1, and are cut away at 9 so that they each bear upon the projecting teeth 7 of the end sections. Back of each of these disks are nuts, 10, which are adapted to threaded portions of the mandrel so that, on turning the nuts, the teeth 7 are clamped firmly together between the disks 8 and while the teeth snugly fit the recesses 6 in the body sections they are independently held together by the clamp disks 8.

The body sections 2 are recessed at 11 in front of each tooth, as shown clearly in Fig. 2, so as to form a gullet for the reception of the chips when the cutter is in action. This enables the cutters to be located in the body sections to such a depth that the strains of the cutting will be resisted by that portion of each body section, at the rear of the teeth.

In order to hold the teeth temporarily to the body sections, while the body sections are being assembled on the mandrel, one edge of each tooth is grooved and one wall of each recess is also grooved, as shown in Fig. 2, a pin 12 being inserted in the opening thus formed. The keyways in the body sections 2 are cut at different points so that, when the body sections are assembled on the mandrel, the teeth of one body section are located slightly in advance of those of an adjoining section so that the cutter is progressive.

We claim:

1. The combination of a mandrel; a series of body sections mounted on the mandrel; a series of teeth located in recesses in each body section, the teeth being wider than the body sections, the body sections being assembled so that the teeth of one section will be in contact with those of an adjoining section; and means for clamping the teeth independently of the body sections.

2. The combination of a mandrel; a series of body sections mounted thereon; means for securing the sections on the mandrel, said body sections having a series of radial recesses; teeth located in said recesses, said teeth being wider than the body sections; a clamping disk at each end of the cutter; and nuts on the mandrel for forcing the disks against the teeth so that the teeth are clamped independently of the body sections.

3. The combination of a mandrel; a series of body sections mounted thereon; means for preventing the sections turning independently on the mandrel, each body section having a projection on one side and a recess at the opposite side of the mandrel so that the projection of one disk fits the recess of an adjoining disk, the body sections also having a series of radial recesses extending to the periphery; teeth located in the recesses, said teeth being wider than the body sections; and a disk at each end of the cutter for clamping the teeth together.

4. The combination of a mandrel; a series of body sections mounted side by side on the mandrel; means for preventing the body sections turning on the mandrel; a series of teeth in each body section, said teeth being wider than the sections, the teeth of one section being in contact with those of an adjoining section, each body section having gullets in front of the teeth; and means, on the mandrel, for clamping the teeth independently of the body sections.

5. The combination in a cutter, of a mandrel; a series of body sections mounted thereon; a key-way in the mandrel and a key-way in each body section, said body sections having slots extending to the periphery; teeth mounted in the slots; means for clamping the teeth; and disks at each end of the cutter, the key-way in each of the body sections being so located that when the body sections are assembled the teeth of one disk are slightly in advance of the teeth of an adjoining disk.

6. The combination in a milling cutter, of a mandrel having screw threads thereon; a series of narrow body sections mounted on the mandrel; keys securing the body sections to the mandrel, each body section having a recess in one side and a projection at the opposite side nearer the mandrel, the projection of one body section being arranged to enter the recess, each body section having a series of radial recesses extending to the periphery and each body section having a gullet formed in front of each recess; teeth mounted in the recesses; means for temporarily holding the teeth in position; a clamping disk at each end of the cutter; and nuts on the threaded portion of the mandrel bearing against the disks, the teeth being wider than the body sections so that they will be clamped independently of the body sections.

JACQUES L. VAUCLAIN.
ANDREW C. VAUCLAIN.